Figure 1:
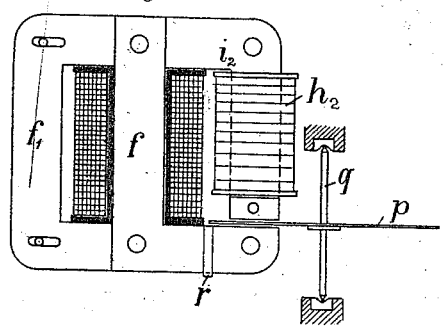

J. GÖRNER.
ELECTRICITY MEASURING INSTRUMENT.
APPLICATION FILED AUG. 31, 1906.

964,015.

Patented July 12, 1910.
5 SHEETS—SHEET 1.

Witnesses
G. O. Kramer
J. J. McCarthy

Inventor
Johannes Görner
by Fisher, Freeman, Watson & Co.,
attorneys

J. GÖRNER.
ELECTRICITY MEASURING INSTRUMENT.
APPLICATION FILED AUG. 31, 1906.

964,015.

Patented July 12, 1910.
5 SHEETS—SHEET 2.

J. GÖRNER.
ELECTRICITY MEASURING INSTRUMENT.
APPLICATION FILED AUG. 31, 1906.

964,015.

Patented July 12, 1910.
5 SHEETS—SHEET 3.

Witnesses
G. P. Kramer
J. J. McCarthy

Inventor
Johannes Görner
by Foster, Freeman, Watson & Coit,
Attorneys

J. GÖRNER.
ELECTRICITY MEASURING INSTRUMENT.
APPLICATION FILED AUG. 31, 1906.

964,015.

Patented July 12, 1910.

5 SHEETS—SHEET 5.

Witnesses
G. P. Kramer
J. J. McCarthy

Inventor
Johannes Görner
by Foster, Freeman, Watson & Coit
Attorneys

UNITED STATES PATENT OFFICE.

JOHANNES GÖRNER, OF ESCHERSHEIM, NEAR FRANKFORT-ON-THE-MAIN, GERMANY, ASSIGNOR TO THE FIRM OF HARTMANN & BRAUN AKTIENGESELLSCHAFT, OF BOCKENHEIM, FRANKFORT-ON-THE-MAIN, GERMANY.

ELECTRICITY-MEASURING INSTRUMENT.

964,015. Specification of Letters Patent. Patented July 12, 1910.

Application filed August 31, 1906. Serial No. 332,812.

*To all whom it may concern:*

Be it known that I, JOHANNES GÖRNER, a subject of the German Emperor, and a resident of Eschersheim, near Frankfort-on-the-Main, Germany, have invented certain new and useful Improvements in Electricity-Measuring Instruments, of which the following is a specification.

This invention relates to electricity measuring instruments in which a movable field generated by several fields of different phases exerts a force on a metallic body so as to impart motion to it. This force causes, according to the purpose for which the instrument is intended, either continuous movement of the metallic body, or it produces against the action of a counteracting force only a displacement of the said body. Both the velocity of the continuous movement, and the extent of the displacement of the metallic body serve as a measure of the corresponding electric magnitudes to be measured.

In wattmeters, or watthourmeters, in which a moving field, such as a Ferraris rotating field, drives a metallic body, this moving field is produced by the coöperation of a pressure field and of a field generated by the working current. If then the working current shows no difference of phase relatively to the potential that generates it, the shunt field must be made to lead or lag exactly by 90° relatively to the field generated by the working current. This phase difference is usually obtained by switching in series with the shunt magnet of the watt-hour meter, or wattmeter, a choking coil, and if necessary, other auxiliary means such as short circuited coils on the working magnets, or the like, must be used in order to increase the phase difference. Recently, the choking field and the working field have been generated by a single coil, magnetic shunts being, for this purpose, so arranged that a part of the field generated by the shunt coil closes on itself without passing through the metal body. This part has only a choking action, while the other part passes through the metallic body and therefore drives it. In this manner very small ohmic resistances are obtained with a large inductive action, so that the phase difference of the shunt field is higher than when the choking coil is in series with the magnet operating the counting mechanism. In the systems heretofore in use, in which a magnetic shunt is provided in parallel to the counter mechanism operating magnetic field, the magnetic lines of force having only a choking action, and those passing through the metallic body, travel, within the shunt coil as well as in the remaining part of the yoke of the electromagnet, through the same mass of iron. An alteration of the magnetic shunt means therefore a considerable alteration of the active field.

Now, the object of my improvements is to provide an instrument of this class in which the active field is not subject to such alterations caused by the said variations of the magnetic shunt. And for this purpose, the choking magnetic lines are completely separated from the working magnetic lines of force. In the examples illustrated the said separation is effected in a simple manner by arranging the laminated iron bodies forming the yoke of the electromagnet in a particular way, as will appear from the following description and the accompanying drawings, in which—

Figure 2:
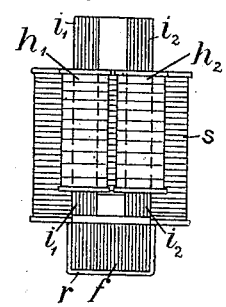
Figure 3:
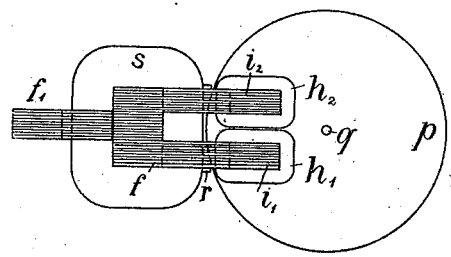
Figure 4:
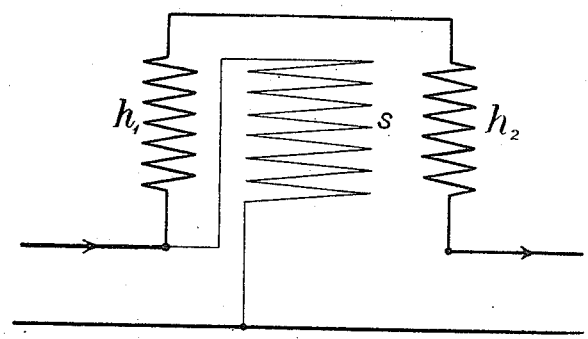
Figure 5:
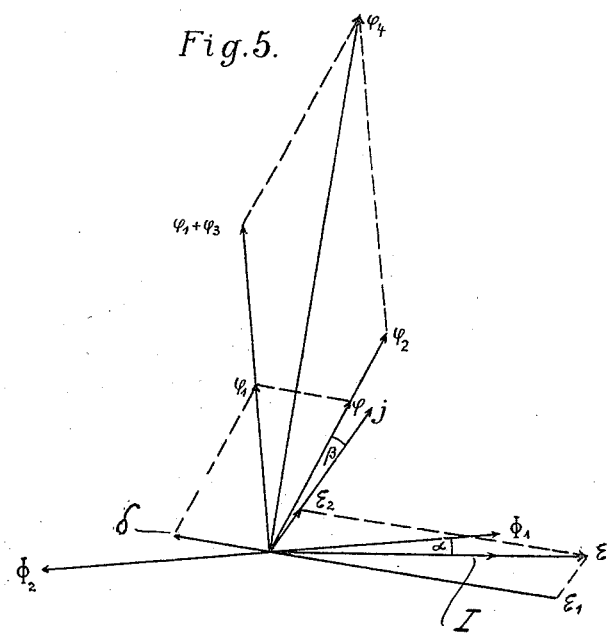
Figure 6:
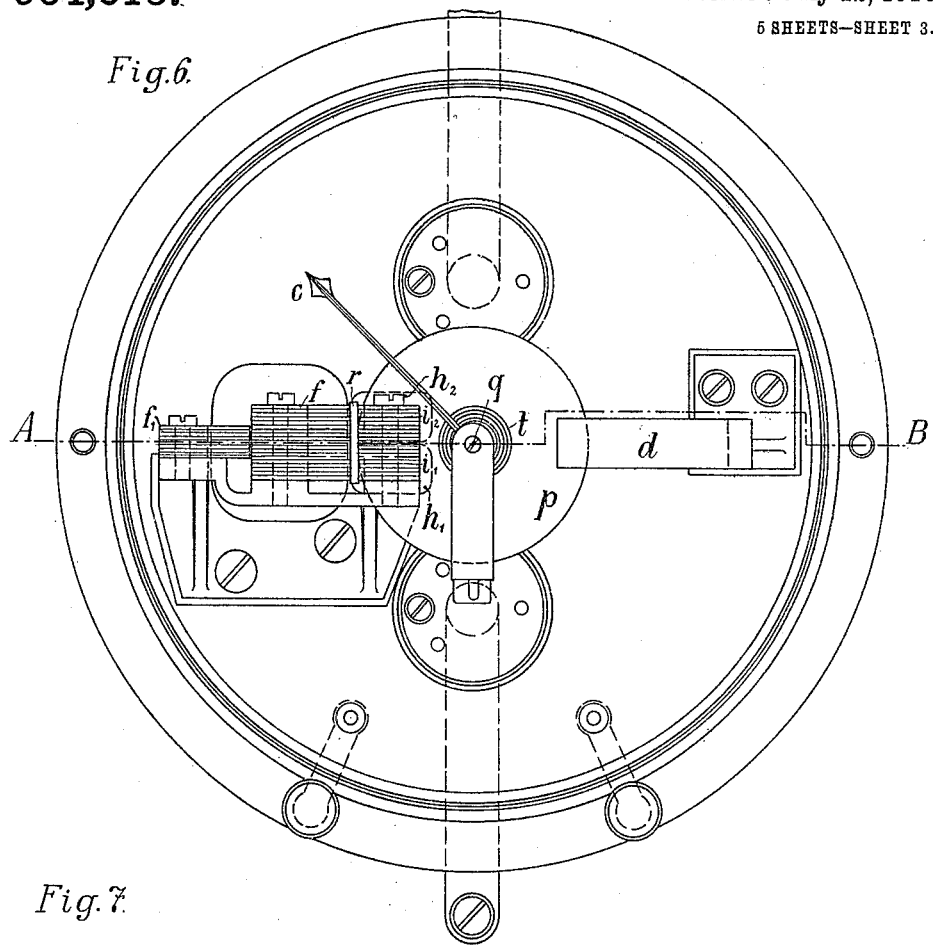
Figure 7:
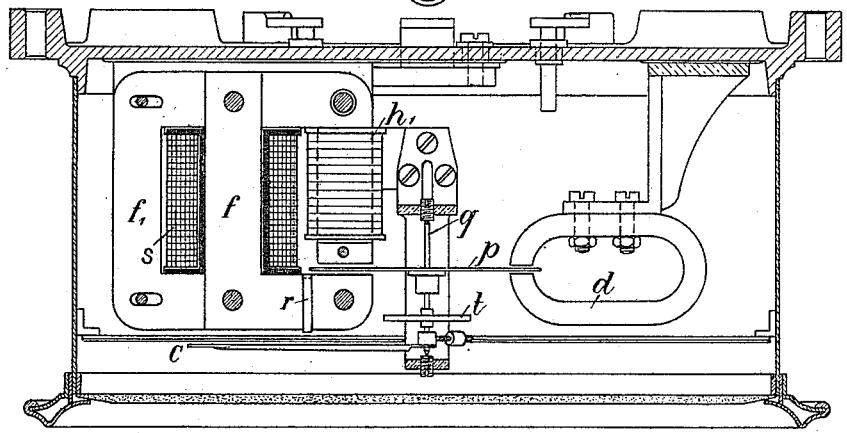
Figure 8:
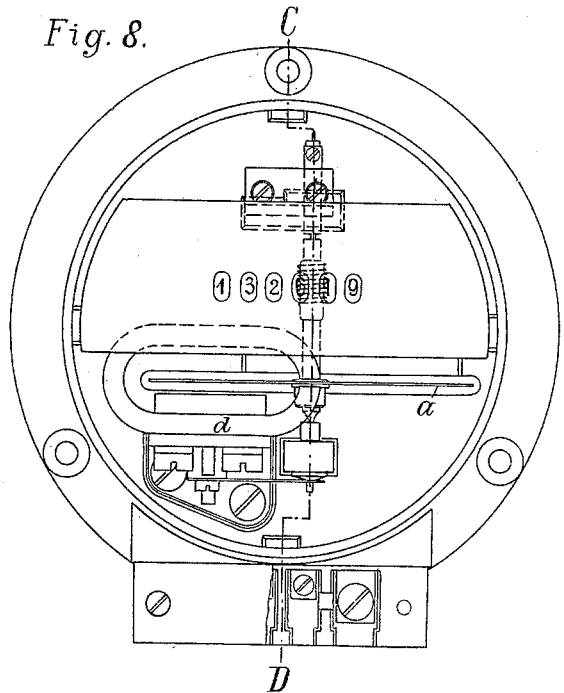
Figure 9:
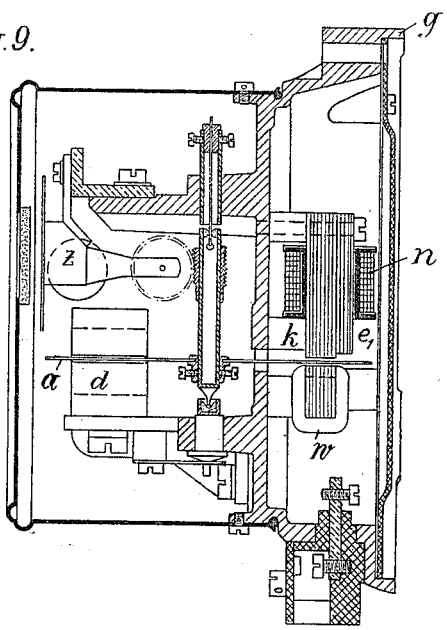
Figure 10:
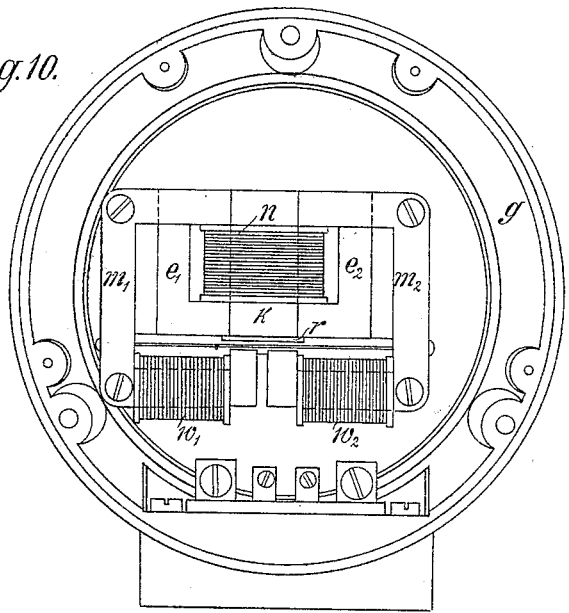
Figure 11:
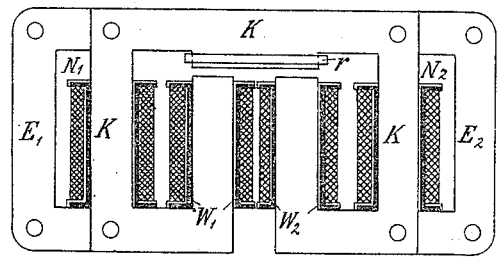
Figure 12:
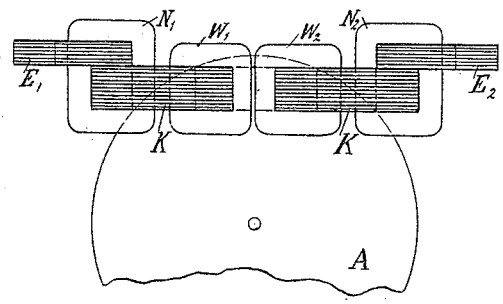

Figures 1 to 3, are diagrammatical views illustrating the principle of the invention, Fig. 1 being a front view of an apparatus, Fig. 2 a side view, and Fig. 3 a plan thereof. Fig. 4, is a diagrammatical view of the system, illustrating the manner of connecting the different apparatus to an alternating circuit, Fig. 5, is a diagram illustrating the relation of the electric forces and the magnetic fields produced thereby, Fig. 6, is a front view of a single phase watt-meter embodying the invention, Fig. 7, is a cross-section of Fig. 6 taken on the line A—B, Fig. 8, is a front view of a watt-hour meter, Fig. 9 is a cross-section of Fig. 8 taken on the line C—D, Fig. 10, is a rear view of the apparatus shown in Fig. 8, Fig. 11, is a cross-section of the electromagnets of a system adapted to be used in a watt-meter as well as in a watt-hour-meter, showing the parts in a diagrammatical way, and Fig. 12, is a plan of Fig. 11 showing in combination with the electromagnet system of Fig. 11, the metallic body operated thereby, all the parts being shown in a diagrammatical way.

The same letters of reference have been used to indicate corresponding parts in all the views.

Referring particularly to the diagrammatical views shown in Figs. 1–3, $f$ is an L-shaped laminated core made up of iron plates of definite thickness to which are connected two other laminated cores $i_1$ and $i_2$, made up of iron plates. These cores $i_1$ $i_2$ have each only one third the thickness of the core $f$ so that the center laminations of the core $f$ are not in contact with the cores $i_1$ $i_2$. These center laminations are however on the side opposite to the cores $i_1$ $i_2$ in magnetic contact with a laminated U-shaped core $f_1$ made up of iron plates the thickness of which core is also only one third of that of the core $f$. The pressure coil $s$ is so arranged on the core $f$ that it is situated between the arms of the U-shaped core $f_1$. The vertical members of the cores $i_1$, $i_2$ are of such length that an air gap is left between their ends and the horizontal arm of the core $f$. A disk $p$ (preferably of aluminium or copper,) and constituting the rotative body, is mounted so that part of it is situated in the said air gap. On the vertical members of the cores $i_1$, $i_2$ are the coils $h_1$ and $h_2$ traversed by the working current, these coils being so wound that a field is generated in the core $i_1$ which field is of opposite direction to that generated in the core $i_2$.

As will appear from the diagram shown in Fig. 4, the coil $s$ is connected in shunt to the working current, whereby it is traversed by a current $j$ proportional to the voltage of the circuit. This current produces three distinct and entirely independent pressure fields $\phi_1$, $\phi_2$, $\phi_3$, the circuit of the first field $\phi_1$ being represented by one third of the laminations of the core $f$, the branch $i_1$, and the air gap receiving the disk $p$. The second field, $\phi_2$, does not pass through the disk $p$, but has merely a choking effect. Its circuit extends through the center laminations of the core $f$ and through the U-shaped yoke $f_1$. The third field, $\phi_3$, passes through the disk $p$, and its circuit is represented by the last third of the laminations of the core $f$, the branch $i_2$, and the air gap provided between the lower branch of the core $f$ and the branch $i_2$, so that this field also intersects the disk $p$. It will therefore be seen, that the pressure coil $s$ embraces the cores of three separate magnetic fields, the first core comprising one third of the core $f$, and the branch $i_1$, the second one comprising the second third of the core $f$ and the U-shaped branch $f_1$, and the third one comprising the last third of the core $f$ and the branch $i_2$. As stated above, the pressure fields crossing the disk $p$ must lead or lag exactly 90 degrees relatively to the working fields, if the working current and its voltage have the same phase. This relation of the phases is obtained by means of the second field not crossing the disk $p$, and furthermore by a short-circuited ring $r$ inclosing the horizontal branch of the core $f$. By locating the said ring at this particular place, the fields produced by the coils $h_1$ and $h_2$ of the working circuit pass through the same, so that the induction exerted by the fields of said coils on the ring is zero, because the effect of both fields is balanced. Therefore, the secondary current induced in the ring is exclusively produced by the pressure fields, whereby it operates to increase the difference of the phases of these pressure fields, which traverse the ring. Therefore, the pressure fields produced by the current $j$ of the shunt coil and passing through the disk $p$ must produce the secondary current in the ring $r$, and they are combined with the field of the said secondary current to form resulting pressure fields $\phi_1$ and $\phi_3$. The field $\phi_2$ traversing the U-shaped branch $f_1$ exerts a choking action on the coil $s$ and thereby assists in increasing the phase difference of the other fields $\phi_1$ and $\phi_3$. The relation of the different fields is illustrated in the diagram shown in Fig. 5. In the said diagram the line E indicates the size and the direction of the voltage of the working current, and I the working current having the same phase as the voltage. On account of the effect of the hysteresis in the iron the fields $\Phi_1$ and $\Phi_2$ of the working currents will be shifted backward at a small angle $a$ relatively to the working current I; one of said fields will appear as negative in the diagram and the other one as positive, because the coils $h_1$ and $h_2$ are wound in opposite directions on the branches $i_1$ and $i_2$. On the pressure coil $s$ no effect is exerted by the fields $\Phi_1$ and $\Phi_2$, because it is traversed by said fields in opposite directions.

The pressure fields $\phi_1$ and $\phi_2$ passing through the branches $i_1$ and $i_2$ are of equal strength and they must be vertical to the fields of the working current. They are represented in the diagram by the line $\phi_1$, because they have the same direction relatively to their passing through the disk $p$ or the coil $s$. The said fields are each the resultant of a field $a$ produced directly by the current $j$ passing through the pressure coil $s$, and lagging relatively to the current $j$ at a small angle $\beta$ on account of hysteresis, and a field $s$ set up by the secondary current induced in the short-circuited ring $r$. The last named field lags behind the field $\phi$ at an angle of more than 90 degrees, because it is induced by $\phi$. Furthermore there is a field $\phi_2$ produced directly by the current $j$ and shifted relatively to said current at a small angle $\beta$ by hysteresis, which field passes through the U-shaped branch $f_1$. Now the effect of the three fields $\phi_1$, $\phi_2$, and $\phi_3$ on the coil $s$ may be substituted by a single field $\phi_4$ which is the resultant of the said fields. This resultant field has an inductive effect on the coil $s$ and produces the pressure E′, which with a comparatively small loss of the voltage $E_2$ on account of the ohmic resistance in the coil $s$ results in the working pressure E.

As shown, the fields $\phi_1$, $\phi_2$ and $\phi_3$ have separate paths in the iron core. Therefore, the change of one of the fields will change the relative number of the lines of force in its magnetic circuit, but it will not affect the other circuits. The U-shaped branch $f_1$ is secured to the common base of the cores by means of screws extending through slit holes, so that it can be adjusted relatively to the core $f$, whereby the strength of the field $\phi_2$ can be regulated. The strength of this field, however, controlling the phase of the current $j$, and thereby also the phases of $\phi_1$ and $\phi_3$, the said adjustment can be used for obtaining the correct phase of $\phi_1$ and $\phi_3$.

Considering that the active pressure fields $\phi_1$ and $\phi_3$ cross the disk $p$ in the same direction, while the directions of the fields of the working currents $\Phi_1$ and $\Phi_2$ are opposed to each other, it will readily be understood, that in the air gap receiving the disk $p$ resulting fields will be produced by the pressure field and the working field below the branches $i$, one of which fields is the sum of the component fields or an aggregate field, while the other one is a differential field.

The aggregate and differential fields traverse the rotative body $p$ at places that are some distance apart, and as the pressure fields passing through the cores $i_1$, $i_2$ and the working field produced by a working current having the same phase as the voltage differ in phase at an angle of 90 degrees, a shifting field is produced and a torque exerted on the rotative body which torque is proportional to the output corresponding to the working current and voltage.

Figs. 5 and 7 show a single phase wattmeter to which the aforesaid arrangement is applied. The disk $p$ is fixed to an axis $q$ which carries a pointer $c$ and a torsional spring $t$. The disk $p$ is rotated from its position of rest by the shifting field until the torsional spring $t$ balances the torque of the shifting field. The resulting rotation of the pointer is proportional to the work performed and can be read on a divided scale behind the pointer $c$. The rotative motion is braked off by a permanent magnet $d$ so that the movable system reaches its new position of rest almost dead beat. The same arrangement can of course be used for watt hour meters, the torsional spring being omitted and the rotational speed resulting from the influence of the shifting field and braking magnet (which rotational speed is proportional to the output) be transmitted by worm and worm-wheel to a counting mechanism indicating watt-hours.

An arrangement based on the same principles, but which is mechanically better adapted to the construction of meters, is shown in Figs. 8, 9 and 10. The pressure coil $n$ is arranged on a core of iron $k$ in the center of the laminated iron mass. The thickness of the core $k$ is such that both the cores $m_1$ and $m_2$ and the cores $e_1$ and $e_2$ can be laid thereon. The cores $m_1$ and $m_2$ carry windings $w_1$ and $w_2$ traversed by the working current which windings are of such polarity that in one of the cores $m_1$, $m_2$ there is an aggregate field due to the working and pressure currents while in the other one of the said cores there is a differential field due to the same currents. Both the aggregate field and the differential field pass through the rotative body $a$ of the movable system in the gap between the core $k$ and the cores $m_1$ $m_2$. In addition to the aforesaid pressure fields in the cores $m_1$ $m_2$ there are also generated distinctly from them, in the cores $e_1$ and $e_2$, other pressure fields which do not pass through the rotative body $a$, but affect, by their choking action, the magnitude of the phase difference of the active pressure fields which pass through the cores $m_1$, $m_2$. Also in this arrangement a short circuiting ring can be placed on the core $k$ below the cores $e_1$, $e_2$ for the purpose of increasing the phase difference.

The operation is the same as that of the arrangement described with reference to Figs. 1 to 7. The same pressure coil produces a plurality of pressure fields, one of said fields extending over part of the cross section of the core $k$ which part is equal to the cross section of the cores $m_1$ and $m_2$, and over the branch $m_2$ and the air gap. A second field extending over the same part of the cross section of the core $k$, the branch $m_1$, and the air gap. And the third field which is the choking field extends over the remaining part of the cross section of the core $k$ which part is equal to the cross section of the branches $e_1$ and $e_2$ and over the latter. If also in this case the entire magnetic circuit of a field is considered as its iron core, the pressure coil embraces the iron cores of the different pressure fields. The function of the apparatus is the same as that of the examples described before. The rotational velocity resulting from the action of the shifting field and of the braking magnet $d$, is transmitted (in the usual, or any suitable manner) to a counting mechanism $z$ by means of a worm and worm wheel.

Another arrangement, which can be used both for watt-hour meters and wattmeters, is shown in Figs. 11 and 12. The principle and operation are the same as in the arrangements described before. On the inner arms of the core K, coils $W_1$ and $W_2$ traversed by the working current are arranged, which coils generate fields which traverse the disk A, in opposite directions. On the outer limbs of the core K and on one leg of each of the cores $E_1$ and $E_2$ pressure coils $N_1$ and $N_2$ are arranged in series, so that the disk A is traversed at one place by two pressure fields acting conjointly with a working field and at another place with similar fields acting differentially. In addition to the two pressure fields there are also generated, in the cores $E_1$ and $E_2$, separate pressure fields which do not pass through the disk A, but exert only a choking action. Therefore, also in this case the same pressure coil incloses several iron cores traversed by separate pressure fields. The transmission of the motion to the counting mechanism, or the oscillation, may be rendered visible in the same.

Claims:

1. In an electric measuring instrument for use in alternating circuits, the combination with a shunt electromagnet and a series electromagnet coöperating to produce a shifting magnetic field, and means to measure the force exerted on said element, of a choking magnetic circuit passing through the coil of said shunt electromagnet and arranged independent of the magnetic circuit of the shunt electromagnet coöperating with the circuit of said series electromagnet.

2. In an electric measuring instrument for use in alternating circuits, the combination with a shunt electromagnet comprising an iron core divided into independent sections, each of said sections being closed in itself by a magnetic limb, part of said magnetic limbs being broken by an air gap and embraced by a series coil coöperating with the shunt electromagnet to produce a shifting magnetic field, an element extending into the air gap and adapted to be acted upon by said shifting magnetic field.

In testimony whereof I have signed my name to this specification in the presence of two subscribing witnesses.

JOHANNES GÖRNER.

Witnesses:
FRANZ HASSLACHER,
MICHAEL VOLK.